(12) United States Patent
Chen

(10) Patent No.: US 8,926,201 B2
(45) Date of Patent: Jan. 6, 2015

(54) KEYBOARD WITH FLEXIBLE PRINTED CIRCUIT DEFINING A PLURALITY OF VENTING HOLES

(75) Inventor: Chao Chen, Waterloo (CA)

(73) Assignee: BlackBerry Limited, Waterloo (CA)

( * ) Notice: Subject to any disclaimer, the term of this patent is extended or adjusted under 35 U.S.C. 154(b) by 1008 days.

(21) Appl. No.: 12/943,667

(22) Filed: Nov. 10, 2010

(65) Prior Publication Data

US 2012/0112933 A1    May 10, 2012

(51) Int. Cl.
```
G06F 3/02      (2006.01)
H01H 13/82     (2006.01)
H01H 13/85     (2006.01)
G06F 1/16      (2006.01)
```

(52) U.S. Cl.
CPC ........ G06F 1/1662 (2013.01); *H01H 2219/062* (2013.01); *H01H 2213/006* (2013.01); G06F 3/0202 (2013.01); *H01H 2221/062* (2013.01); G06F 1/1626 (2013.01); *H01H 2217/006* (2013.01)
USPC ........... 400/480; 400/472; 400/481; 200/306; 200/515

(58) Field of Classification Search
CPC ....... G06F 3/02; G06F 3/0202; G06F 3/0224; H01H 13/48; H01H 13/85; H01H 2213/006; H01H 2213/00; H01H 2213/004; H01H 13/7065
USPC .......... 400/472, 490, 495, 480, 481; 200/515, 200/310, 311, 314, 306
See application file for complete search history.

(56) References Cited

U.S. PATENT DOCUMENTS

| | | | | |
|---|---|---|---|---|
| 5,874,700 A | * | 2/1999 | Hochgesang | 200/515 |
| 8,253,052 B2 | * | 8/2012 | Chen | 200/512 |
| 2003/0173198 A1 | * | 9/2003 | Hanahara et al. | 200/314 |
| 2009/0008234 A1 | * | 1/2009 | Tolbert et al. | 200/600 |
| 2010/0309030 A1 | * | 12/2010 | Huang et al. | 341/33 |
| 2011/0149573 A1 | * | 6/2011 | Lee et al. | 362/253 |
| 2012/0050166 A1 | * | 3/2012 | Walden et al. | 345/169 |

FOREIGN PATENT DOCUMENTS

| | | | | |
|---|---|---|---|---|
| EP | 0367204 | 5/1990 | | |
| EP | 2221843 | 8/2010 | | |
| JP | 10302572 A | * 11/1998 | | H01H 13/70 |
| JP | 2006173025 A | * 6/2006 | | H01H 13/702 |
| JP | 2008159563 A | * 7/2008 | | H01H 13/702 |

OTHER PUBLICATIONS

European Search Report, Application No. 10191065, Dated Apr. 2, 2014.

* cited by examiner

*Primary Examiner* — Daniel J Colilla
(74) *Attorney, Agent, or Firm* — Ridout & Maybee LLP

(57) ABSTRACT

A keyboard includes a stiffener having a plurality of recesses defined therein, a flexible printed circuit defining a plurality of venting holes, each venting hole in correspondence with one of the plurality of recesses, and a dome sheet provided on top of the flexible printed circuit and including a plurality of domes, each of the domes in correspondence with one of the plurality of venting holes.

20 Claims, 11 Drawing Sheets

KEYBOARD WITH FLEXIBLE PRINTED CIRCUIT DEFINING A PLURALITY OF VENTING HOLES

BACKGROUND OF THE DISCLOSURE

This disclosure is directed to a keyboard, and more particularly to a keyboard configured for providing a controlled tactile feedback during use.

Keyboards for portable devices are generally well known and typically include several layers stacked together and secured within the device. In some cases, these keyboards provide a tactile or "audible click" feedback to a user during operation. This tactile feedback alerts the user that their input has been recognized by the device. However, in some instances, the user may not want the keyboard to provide the tactile feedback, or may want the volume of the tactile feedback reduced. For example, if the user is typing on the keyboard while in a meeting or at a library, the audible feedback may be heard by and bothersome to other people in the room.

DETAILED DESCRIPTION

Figure 1:
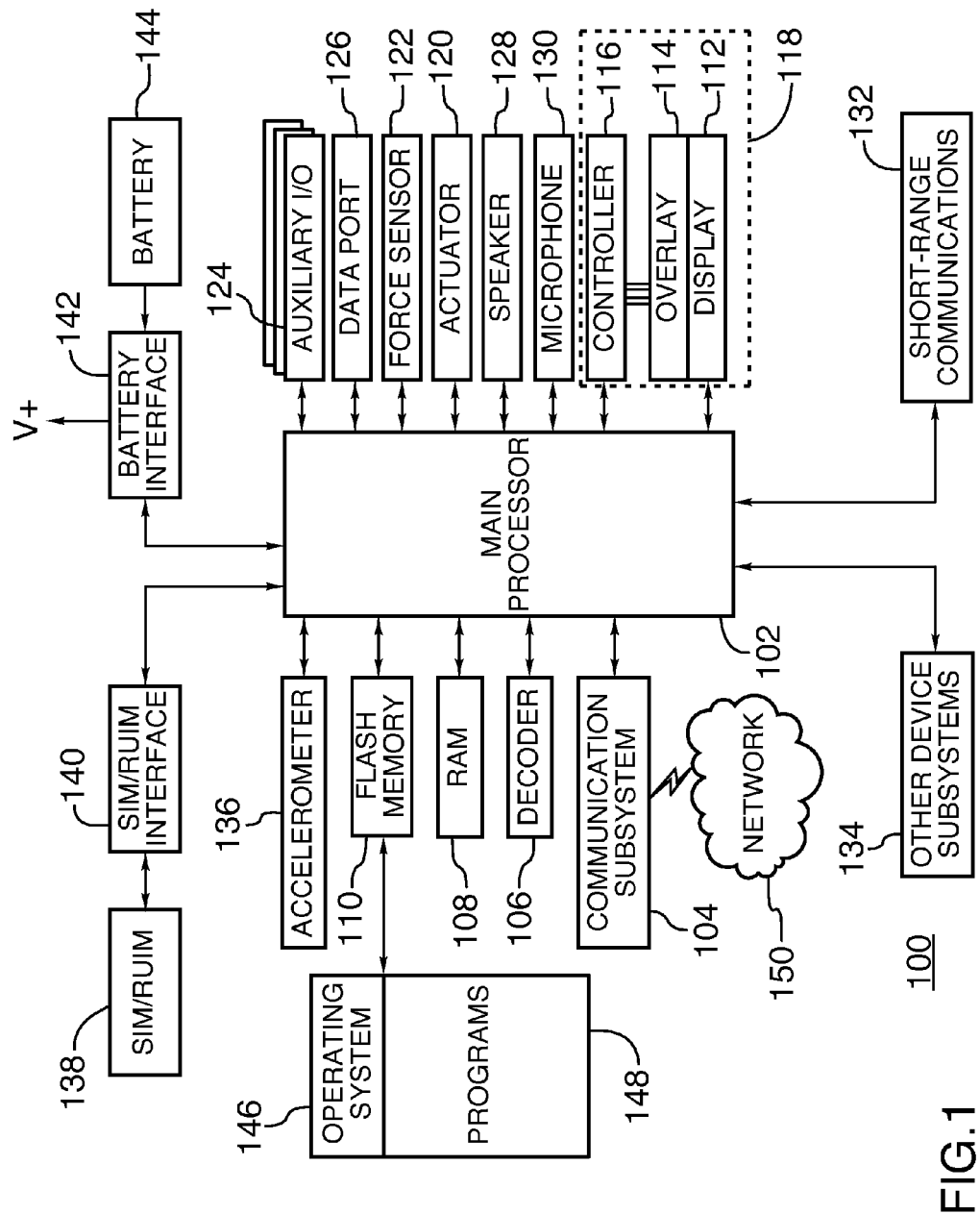
FIG. 1 is a block diagram showing components of a device in accordance with the present disclosure.

It will be appreciated that for simplicity and clarity of illustration, where considered appropriate, reference numerals may be repeated among the figures to indicate corresponding or analogous elements. In addition, numerous specific details are set forth in order to provide a thorough understanding of the embodiments described herein. However, it will be understood by those of ordinary skill in the art that the embodiments described herein may be practiced without these specific details. In other instances, well-known methods, procedures and components have not been described in detail so as not to obscure the embodiments described herein. Also, the description is not to be considered as limiting the scope of the embodiments described herein.

A keyboard for an electronic device is described herein. The device can be a two-way communication device with advanced data communication capabilities including the capability to communicate with other mobile devices or computer systems through a network of transceiver stations. The device may also have the capability to allow voice communication. Depending on the functionality provided by the device, it may be referred to as a data messaging device, a two-way pager, a cellular telephone with data messaging capabilities, a wireless Internet appliance, or a data communication device (with or without telephony capabilities). To aid the reader in understanding the structure of the mobile device and how it communicates with other devices and host systems, reference will now be made to FIG. 1, which shows a simplified block diagram of components of an electronic device 100 according to one embodiment.

The device 100 includes multiple components such as a processor 102 that controls the operations of the device. Communication functions, including data communications, voice communications, or both may be performed through a communication subsystem 104. Data received by the device 100 is decompressed and decrypted by a decoder 106. The communication subsystem 104 may receive messages from and send messages to a wireless network 150.

The wireless network 150 may be any type of wireless network, including, but not limited to, data-centric wireless networks, voice-centric wireless networks, and dual-mode networks that support both voice and data communications.

The device 100 may be a battery-powered device and as shown includes a battery interface 142 for receiving one or more rechargeable batteries 144.

The processor 102 generally interacts with subsystems such as, for example, a Random Access Memory (RAM) 108, a flash memory 110, a display 112 (which may have a touch-sensitive overlay 114 connected to an electronic controller 116 that together comprise a touch-sensitive display 118), an actuator assembly such as a keyboard 120, one or more optional force sensors 122, an auxiliary input/output (I/O) subsystem 124, a data port 126, a speaker 128, a microphone 130, short-range communications 132 and other device subsystems 134.

User-interaction with the graphical user interface may be performed through the touch-sensitive overlay 114. The processor 102 interacts with the touch-sensitive overlay 114 via the electronic controller 116. Information, such as text, characters, symbols, images, icons, and other items may be displayed or rendered on the touch-sensitive display 118 via the processor 102. The device 100 may also include a non-touch sensitive, or LCD display, and is not limited to the touch-sensitive display as described above.

The device 100 may also include an accelerometer 136 as shown in FIG. 1, configured to interact with the processor 102. The accelerometer 136 may include a cantilever beam with a proof mass and suitable deflection sensing circuitry. The accelerometer 136 may be utilized for detecting direction of gravitational forces or gravity-induced reaction forces.

To identify a subscriber for network access according to the present embodiment, the device 100 may use a Subscriber Identity Module or a Removable User Identity Module (SIM/RUIM) card 138 inserted into a SIM/RUIM interface 140 for communication with a network, such as the wireless network 150.

Alternatively, user identification information may be programmed into the flash memory 110.

The device 100 also includes an operating system 146 and software components or programs 148 that are executed by the processor 102 and which may be stored in a persistent store such as the flash memory 110. Additional applications may be loaded onto the device 100 through the wireless network 150, the auxiliary I/O subsystem 124, the data port 126, the short-range communications subsystem 132, or any other suitable device subsystem 134.

In use, a received signal such as a text message, an e-mail message, or web page download is processed by the communication subsystem 104 and input to the processor 102. The processor 102 then processes the received signal for output to the display 112 or alternatively to the auxiliary I/O subsystem 124. A subscriber may also compose data items, such as e-mail messages, for example, which may be transmitted over the wireless network 150 through the communication subsystem 104.

For voice communications, the overall operation of the device 100 is similar. The speaker 128 outputs audible information converted from electrical signals, and the microphone 130 converts audible information into electrical signals for processing.

Figure 2:
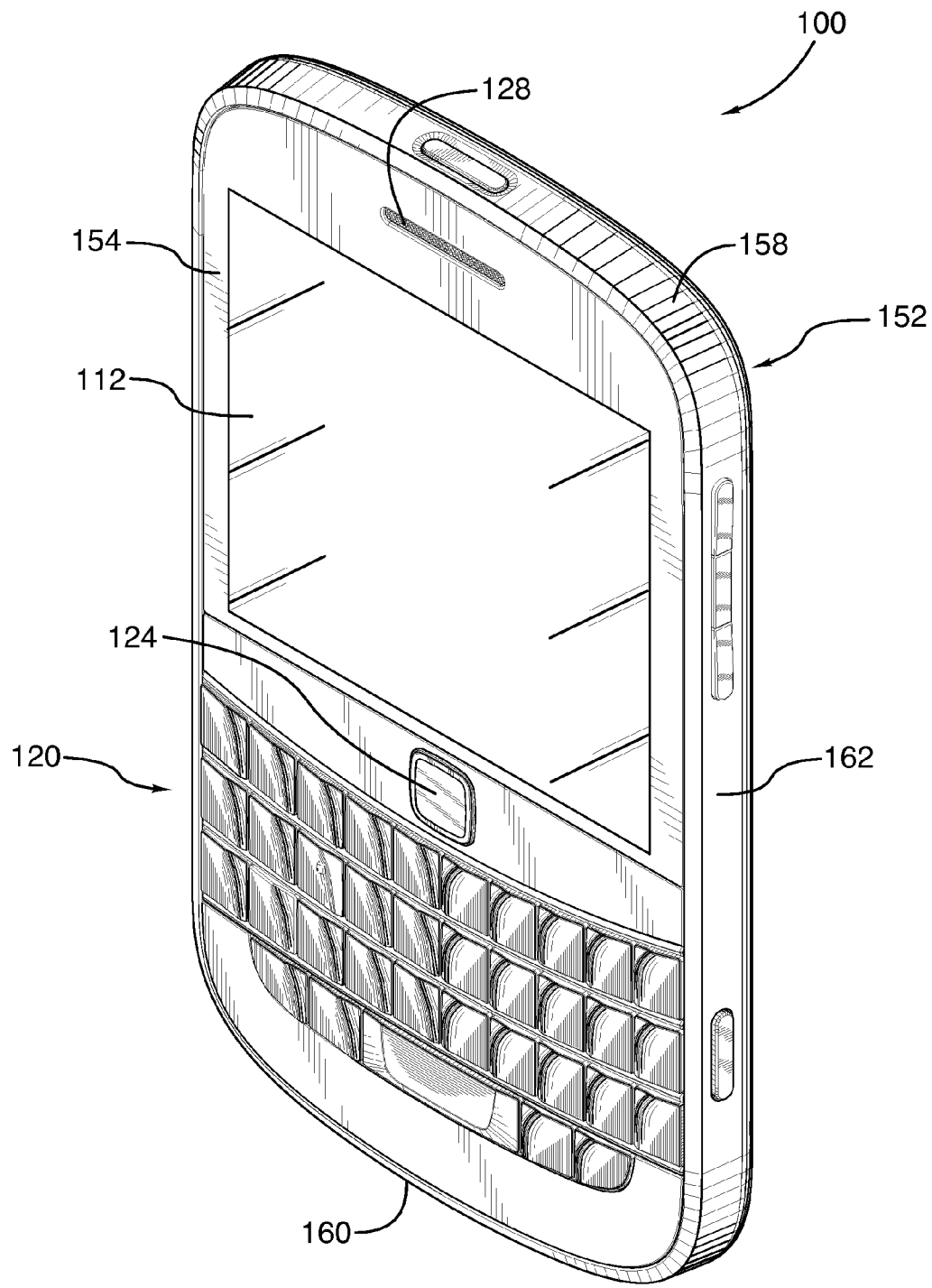
FIG. 2 is a front perspective view of the device.
Figure 3:
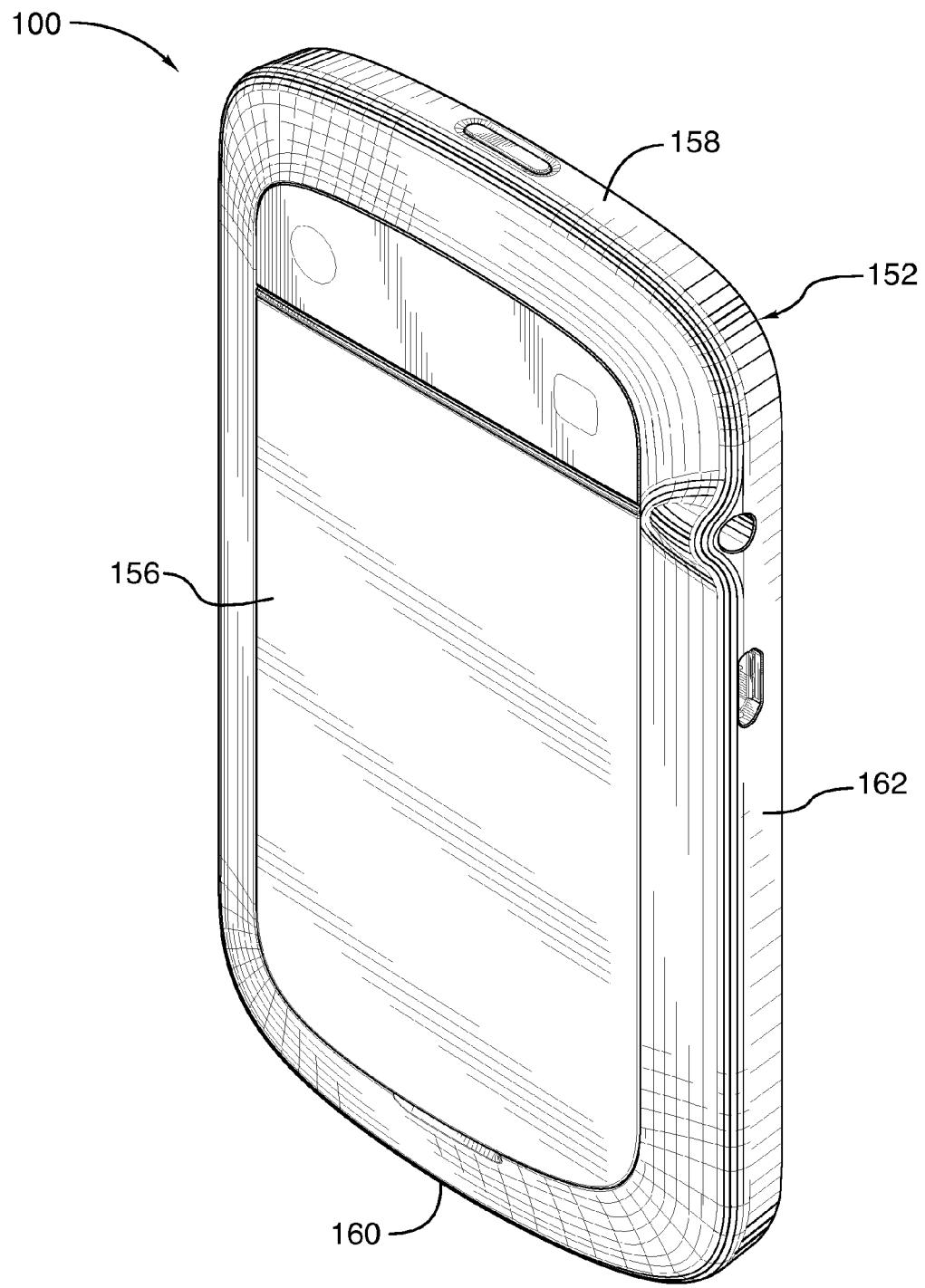
FIG. 3 is a back perspective view of the device.

Referring next to FIGS. 2 and 3, the device 100 includes a housing 152 configured for retaining the internal components shown in FIG. 1 and described above. The housing 152 includes a front face 154, a back face 156, and a top edge 158, a bottom edge 160 and a pair of sidewalls 162 joining the front and back faces to each other. As seen in FIG. 2, the front face 154 includes the display 118, the keyboard 120 and the auxiliary I/O device 124, which in the present disclosure is an optical track pad. However, it is recognized that the auxiliary I/O device is not limited to an optical track pad, and could also be a trackball, joystick, or other navigational device.

Figure 4:
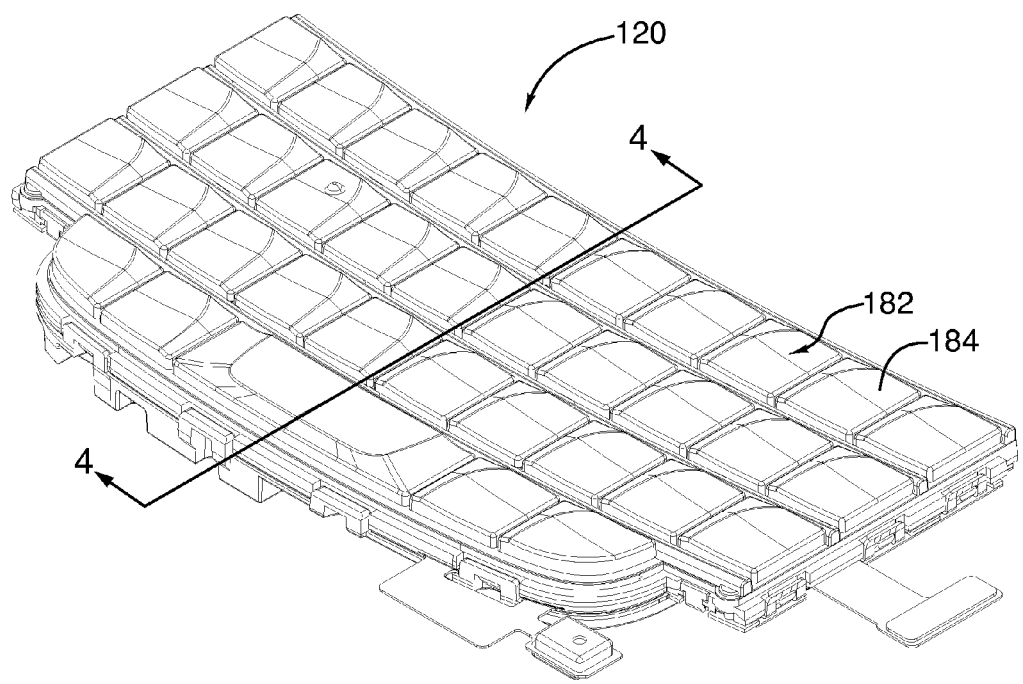
FIG. 4 is a front perspective view of a keyboard of the device.
Figure 5:
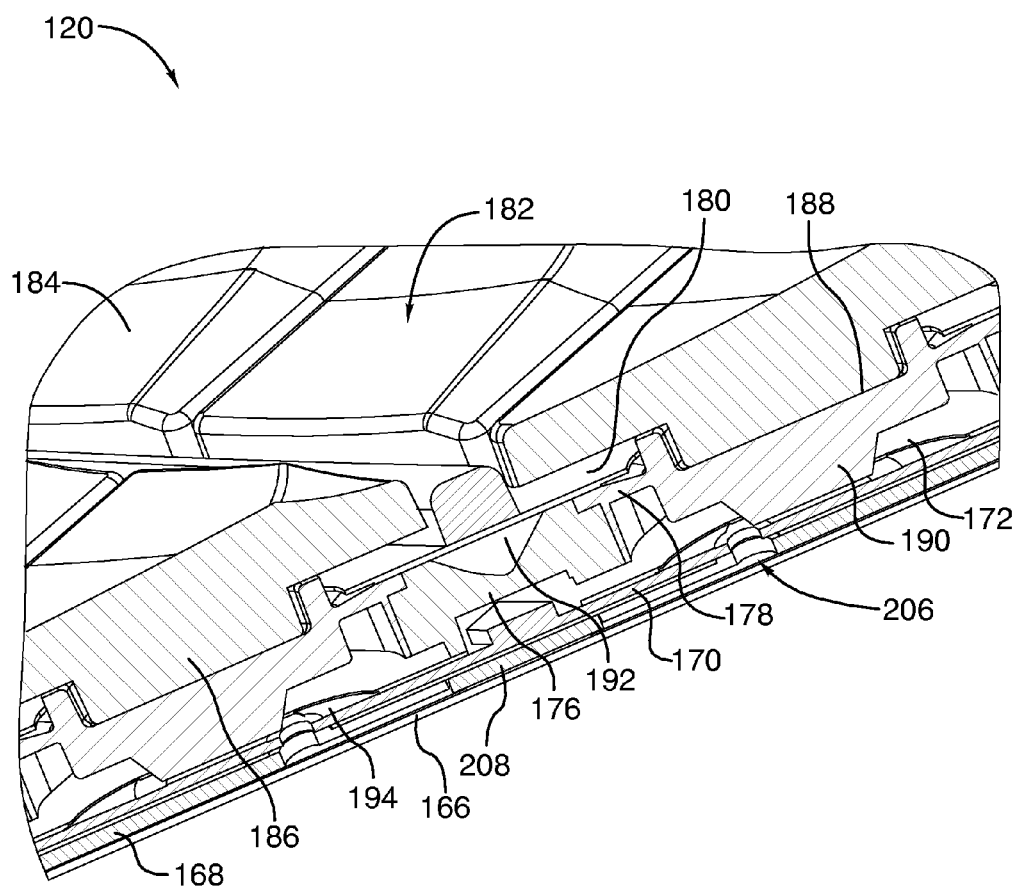
FIG. 5 is a close-up, partial cross-section view of the keyboard, taken along line 4-4 in FIG. 4 and in the direction indicated.

As seen in FIGS. 4-5, the keyboard 120 can be comprised of numerous layers stacked upon each other and is received within a corresponding cavity (not shown) defined in the front face 154 of the housing 152. As will be described in further detail below, the keyboard 120 can include a bottom layer 166 (which in some embodiments may be a printed circuit board or PCB), a stiffener layer 168 secured to the bottom layer by an adhesive, and a flexible printed circuit board or FPC 170 provided on top of the stiffener layer. The assembly 120 can further include a dome sheet 172 having a plurality of domes 174, a light guide 176, a deflection web 178 and a light shielding film 180 placed over the light guide and the deflection web. It is to be understood that the keyboard 120 is not limited to the above-described components, and may include fewer or more components to suit the application.

At the uppermost layer, the keyboard 120 includes a plurality of keys or keycaps 182 that are arranged in a keyboard layout and that are configured for actuation during operation of the keyboard. In the present disclosure, the keys 182 are arranged in a full keyboard layout (such as a QWERTY, QWERTZ, or AZERTY layout), but it is contemplated that reduced keyboard or numeric layouts may also be suitable. Each key 182 includes a contact surface 184 and a post 186 extending away from the contact surface. The contact surface 184 is configured for contact by a user's finger or thumb, and typically includes indicia thereon, either in the form of an alphanumeric character and/or a symbol.

The keys 182 are secured to the deflection web 178, as can be seen in FIG. 5. Specifically, the deflection web 178 defines a plurality of seats 188, each of which is configured for receiving a corresponding one of the key posts 186. The keys 182 may be secured to the seats 188 by an adhesive, for example. The deflection web 178 further includes a plurality of actuators 190, each of which are in correspondence with one of the seats 188. As shown in FIG. 5, the actuators 190 extend away from the seats 188 and are configured for engaging a corresponding one of the domes 174 during key actuation, which will be described in further detail below. Although alternative materials with similar properties may be appropriate, the deflection web 178 is composed from a flexible rubber material, such as silicon rubber.

In the present disclosure, the light guide 176 is co-molded with the deflection web 178; however, it is appreciated that in alternate embodiments, the light guide 176 could be separately formed from the deflection web. By co-molding the light guide 176 and the deflection web 178, it is contemplated that the light guide may provide structural support for the deflection web. The light guide 176 is configured for directing light to the keys 182 during operation of the device 100, and may include optical features 192 configured to redirect received light towards the keys 182. The optical features 192 and the light guide can be composed of plastic polycarbonate, although alternative materials with similar properties may be suitable. In the present disclosure, the light shielding film 180 is provided between the light guide/deflection web 176/178 and the keys 182, is composed of a polyester or PET film and is configured for preventing light emitted from the light guide 176 from scattering/spreading to adjacent keys 182.

Figure 6:
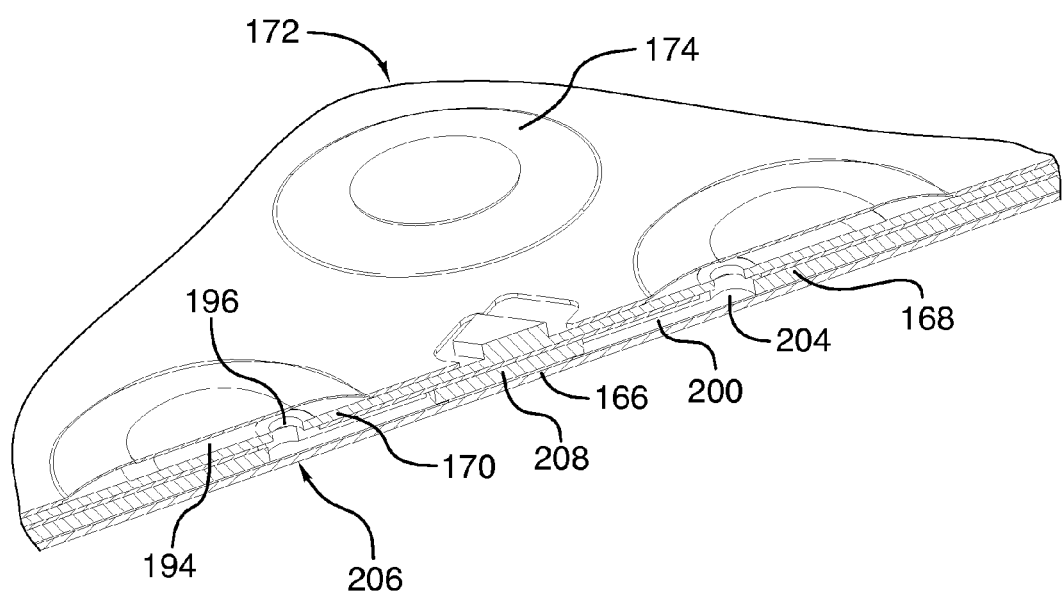
FIG. 6 is a close-up, partial cross-section view of a dome sheet layer of the keyboard shown in FIG. 5.

As briefly described above and as seen in FIGS. 5-7, the dome sheet 172 includes the plurality of domes 174, which are in alignment with the actuators 190 and the keys 182. Provided below the dome sheet 172 is the FPC 170, which includes a plurality of circuit traces 194, each of which are in registry with a corresponding one of the domes 174, actuators 190 and keys 182. During operation of the device 100, when one of the keys 182 is depressed, the corresponding actuator 190 engages the related dome 174, which in turn contacts the circuit trace 194, creating a circuit and sending a signal to the processor 102. Although other shapes may be suitable, the circuit traces 194 are substantially circular, corresponding to the substantially circular cross-section of the domes 174, and each define a venting hole 196, which will be described in further detail below.

Figure 7:
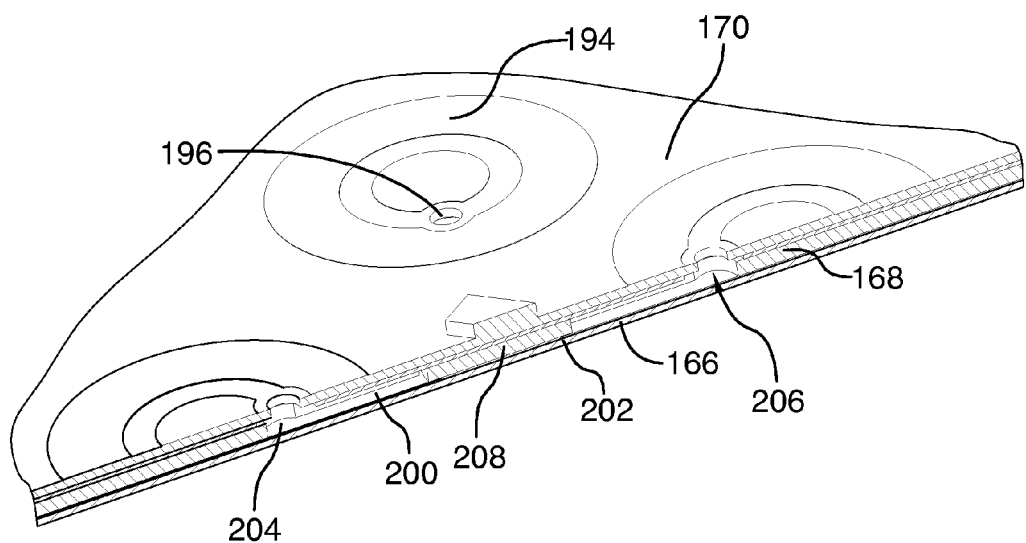
FIG. 7 is a close-up, partial cross-section view of a circuit trace layer of the keyboard shown in FIG. 5.
Figure 8:
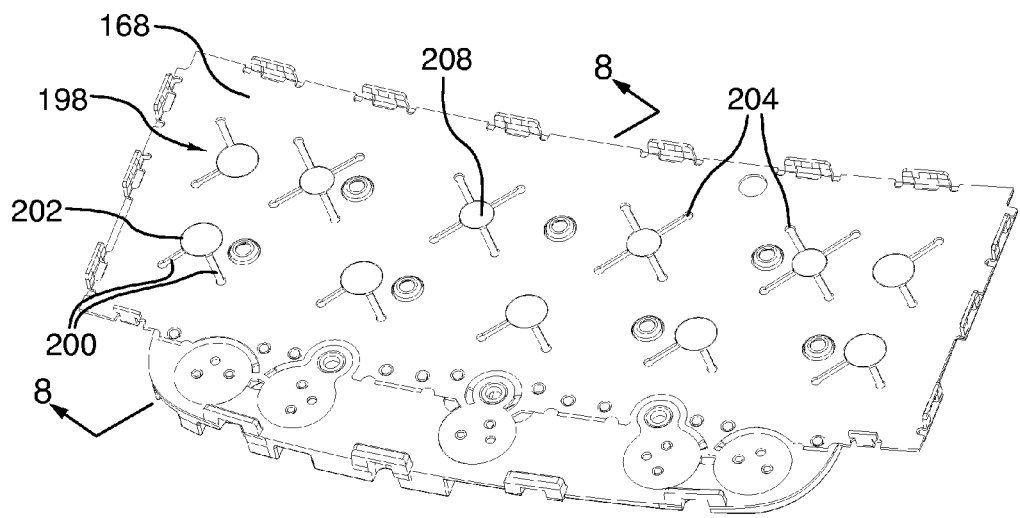
FIG. 8 is a front perspective view of the keyboard showing a stiffening layer.
Figure 9:
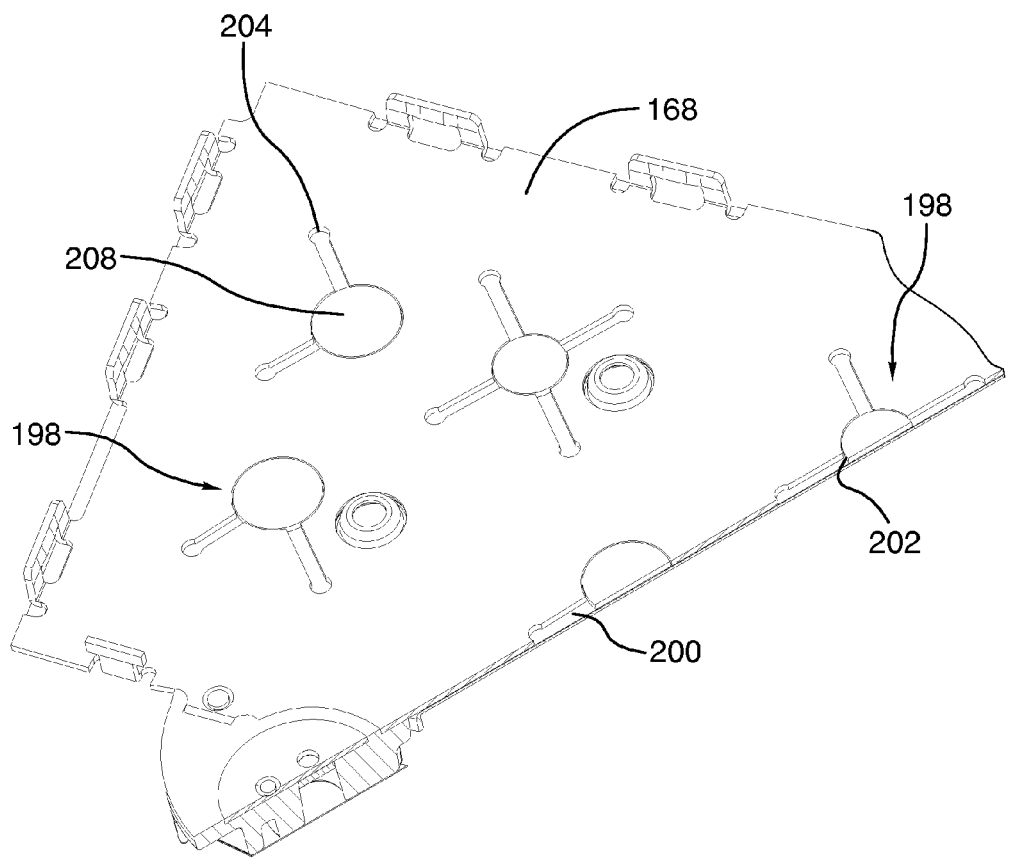
FIG. 9 is a close-up, partial cross-section view of the keyboard taken along line 8-8 of FIG. 8 and in the direction indicated.
Figure 10:
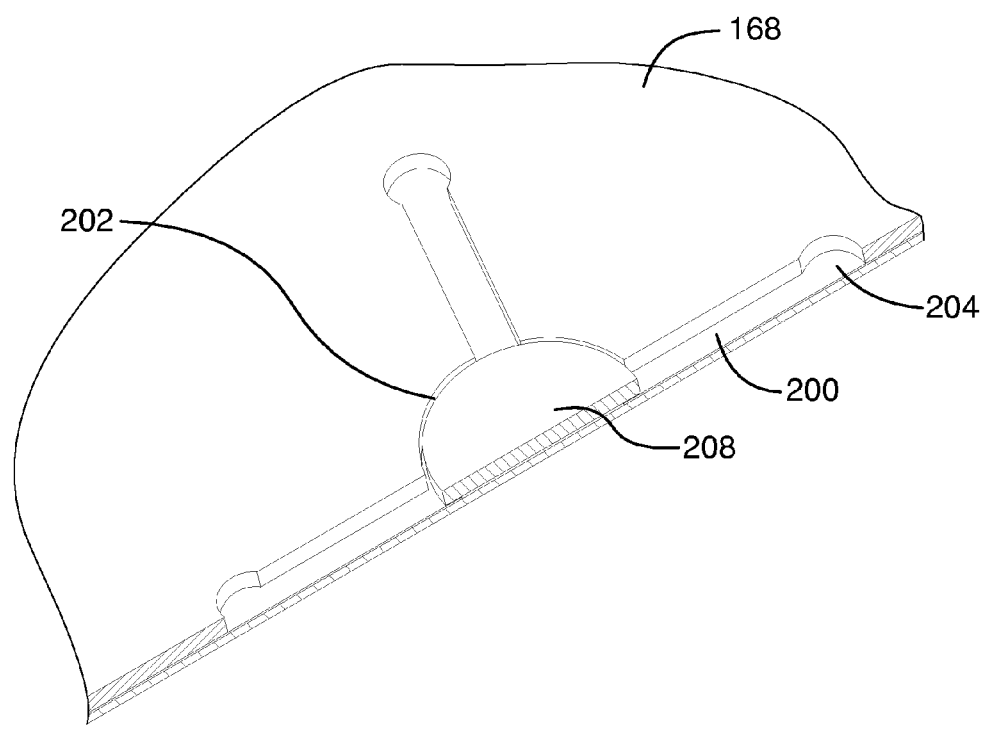
FIG. 10 is another partial cross-section view of the keyboard, taken along line 8-8 of FIG. 8 and in the direction indicated.

Turning next to FIGS. 7-10, the stiffener 168 is configured for providing structure and rigidity to the keyboard 120, and includes a plurality of recesses 198 defined therein. As seen in FIGS. 8-10, each of the recesses 198 includes a plurality of venting channels 200 extending from a pocket 202, where each of the channels includes a chamber 204 provided at a distal end thereof. Although other configurations may be suitable, the venting channels 200 radially extend from the pocket 202, which is substantially circular. Each of the venting channels 200 is oriented substantially 90° from an adjacent venting channel, such that each chamber 204 is configured for alignment with a corresponding one of the venting holes 196. It is appreciated that other arrangements of the venting channels 200 may be suitable, so long as the chambers 204 are aligned with a corresponding one of the venting holes 196. As will be described in further detail below, when the keyboard 120 is assembled together, the venting holes 196 and their corresponding chambers 204 define a venting cavity 206 (FIG. 7). During keyboard operation, the venting cavity 206 acts as an air conduit, enabling air from the venting channels to travel up and into the space created between the domes 174 (when uncompressed) and the FPC 170.

The stiffener 168 further includes a plurality of dampening components 208, each configured for being received in a corresponding one of the pockets 202. The dampening components 208 can be manufactured from a high density foam material, although other materials with similar properties may be appropriate. While other dimensions may be suitable, the dampening components can have a thickness in the range of approximately 0.20-0.70 mm, and more specifically, can have a thickness of approximately 0.3 mm. It is contemplated that this range of thickness enables optimal air flow control through the venting channels 200 during keyboard operation. Although alternative attachment methods may be suitable, in the present disclosure the dampening components 208 are secured within their respective pockets 202 by an adhesive (not shown) that can be provided directly on a bottom surface of the dampening component.

Figure 11:
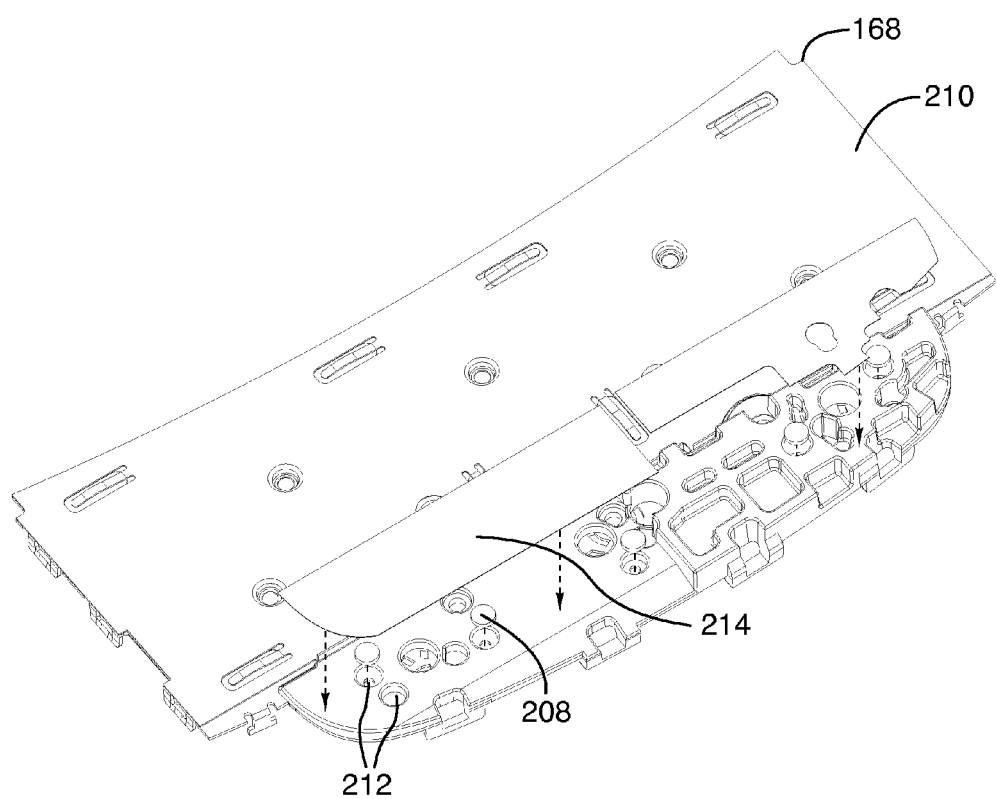
FIG. 11 is a rear perspective view of a bottom of the keyboard shown in FIG. 4.

Referring next to FIG. 11, a back face 210 of the stiffener 168 includes a plurality of openings 212 defined proximal to a lower edge of the stiffener. Each of the openings 212 may correspond to a function key (such as a space bar, shift key and alt key) provided on a lower row of the keyboard 120. The openings 212 are configured for receiving a corresponding dampening component 208, as indicated by the broken lines in the figure. To retain the dampening components 208 within their respective opening 212, a film layer 214 is provided and is configured for covering the openings and the surrounding area of the stiffener 168. Although other means of securing the film layer 214 to the back face 210 may be suitable, in the present disclosure, the film layer is attached to the back face 210 by an adhesive (not shown). The film layer 214 covers the openings 212 and dampening components 208, thereby preventing dust, moisture and other contaminants from penetrating the dampening components and openings.

As briefly discussed above, the dampening components 208 control the release of air out through the venting cavity 206 during keyboard operation. More specifically, when one of the keys 182 is depressed, the corresponding actuator 190 engages the relative dome 174. Upon such contact, the dome 174 collapses and contacts the corresponding circuit trace 194, creating a circuit and sending an input signal to the processor 102. When the dome 174 collapses, the air that was present between the resting dome and the FPC 168 escapes through the venting cavity 206 to the corresponding venting channel 200, where it is "captured" by the dampening component 208.

Upon release of the key 182, the actuator 190 disengages from the corresponding dome 174, breaking the circuit and causing the trapped air to be released back through the venting channel 200, the venting cavity 206, and into the space defined between the resting dome 174 and the FPC 168. It is during the key release that a tactile feedback is typically provided to the user, in the form of a "clicking" noise. The dampening components 208 are configured for controlling the release of the trapped air, such that the "clicking" tactile feedback is quieter and more pleasant to the user and those that may be in the vicinity of the user.

In keyboard assemblies that provide tactile feedback, the venting channels (if provided) are typically unobstructed and configured for providing a pronounced audible feedback. However, when a user is typing on the device 100 in a quiet setting (such as in a meeting), it may be desirable that the "clicking" noise be muted so as not to disturb others. By providing the dampening components 208, the air release is controlled and diffused by the dampening components, thereby reducing the audible feedback received during key actuation.

While a particular embodiment of the present keyboard has been described herein, it will be appreciated by those skilled in the art that changes and modifications may be made thereto without departing from the disclosure in its broadest aspects and as set forth below.

The invention claimed is:

1. A keyboard comprising:
    a stiffener having a plurality of recesses defined therein;
    a flexible printed circuit defining a plurality of venting holes, each venting hole in correspondence with one of the plurality of recesses;
    a dome sheet provided on top of said flexible printed circuit and including a plurality of domes, each of said domes in correspondence with one of the plurality of venting holes; and
    a plurality of dampening components for dampening tactile feedback generated during actuation of a key of the keyboard, each dampening component being received in a corresponding one of the plurality of recesses.

2. The keyboard of claim 1 wherein each of the recesses includes a plurality of channels extending from a pocket, each of said channels including a chamber at a distal end thereof.

3. The keyboard of claim 2 wherein each of said chambers is in alignment with a corresponding one of said venting holes.

4. The keyboard of claim 1 wherein the flexible printed circuit further includes a plurality of circuit traces, each of said circuit traces in correspondence with one of said plurality of domes.

5. The keyboard of claim 1 further including a deflection web placed on top of said dome sheet, the deflection web including a plurality of actuators extending therefrom, each actuator in correspondence with one of said plurality of domes.

6. The keyboard of claim 5 further including a plurality of keys, each key including a contact surface and a post extending from the contact surface.

7. The keyboard of claim 6 wherein said deflection web defines a plurality of seats, each seat in correspondence with one of said actuators and configured for receiving a corresponding one of said posts.

8. The keyboard of claim 1 further including a light guide comprising:
    optical features provided on the lightguide; and
    a light shielding film provided on top of said light guide.

9. The keyboard of claim 1 further including a film layer adhered to a back face of said stiffener.

10. The keyboard of claim 1 wherein a back face of said stiffener includes a plurality of openings defined therein, each of said openings being configured for receiving a corresponding one of said dampening components.

11. The keyboard of claim 10 wherein said openings are defined proximal to a lower edge of said stiffener.

12. The keyboard of claim 11 further including a film layer configured for covering said openings and for retaining said dampening components within said openings.

13. The keyboard of claim 1 wherein the plurality of dampening components comprises a plurality of foam pieces.

14. A device including:
    a housing;
    a keyboard provided in said housing, said keyboard including:
        a stiffener having a plurality of recesses defined in a front face thereof;
        a plurality of dampening components for dampening tactile feedback generated during actuation of a key of the keyboard, each dampening component being received in a corresponding one of the recesses;
        a flexible printed circuit defining a plurality of venting holes, each venting hole in correspondence with one of the plurality of recesses; and
        a dome sheet provided on top of said flexible printed circuit and including a plurality of domes, each of said domes in correspondence with one of the plurality of venting holes.

15. The device of claim 14 wherein each of said plurality of recesses includes a pocket and at least one channel extending radially from said pocket.

16. The device of claim 15 wherein each of said dampening components is received in a corresponding one of said pockets.

17. The device of claim 15 wherein said pocket is substantially circular.

18. The device of claim 15 wherein each of said channels includes a chamber at a distal end thereof, each of said chambers being in alignment with a corresponding one of said venting holes.

19. The device of claim 14 wherein said keyboard further includes a film layer adhered to a back face of said stiffener.

20. A keyboard comprising:
- a stiffener having a plurality of recesses defined therein;
- a plurality of foam pieces, each being received in a corresponding one of the recesses;
- a flexible printed circuit defining a plurality of venting holes, each venting hole in correspondence with one of the plurality of recesses;
- a dome sheet provided on top of said flexible printed circuit and including a plurality of domes, each of said domes in correspondence with one of the plurality of venting holes;
- a deflection web including a plurality of actuators, each actuator in correspondence with one one of said domes; and
- a plurality of keys, each key corresponding to one of said domes and including a contact surface and a post extending from said contact surface, said post configured for engaging a corresponding one of said actuators;
- wherein the foam pieces are configured for dampening tactile feedback generated during actuation of the keys.

* * * * *